Dec. 27, 1938.　　B. T. RODD ET AL　　2,141,696
STORM CENTER LOCATOR
Filed July 8, 1936　　2 Sheets-Sheet 2
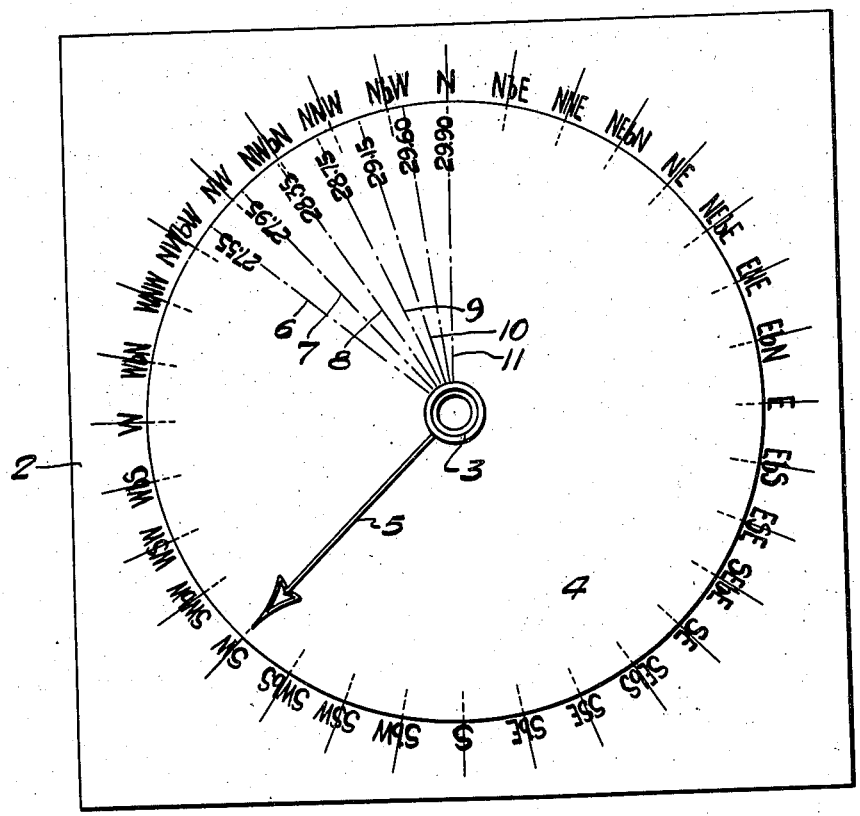
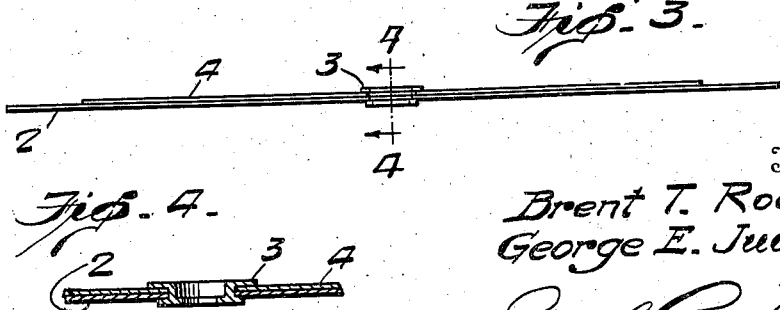
Inventors
Brent T. Rodd
George E. Judd Patented Dec. 27, 1938

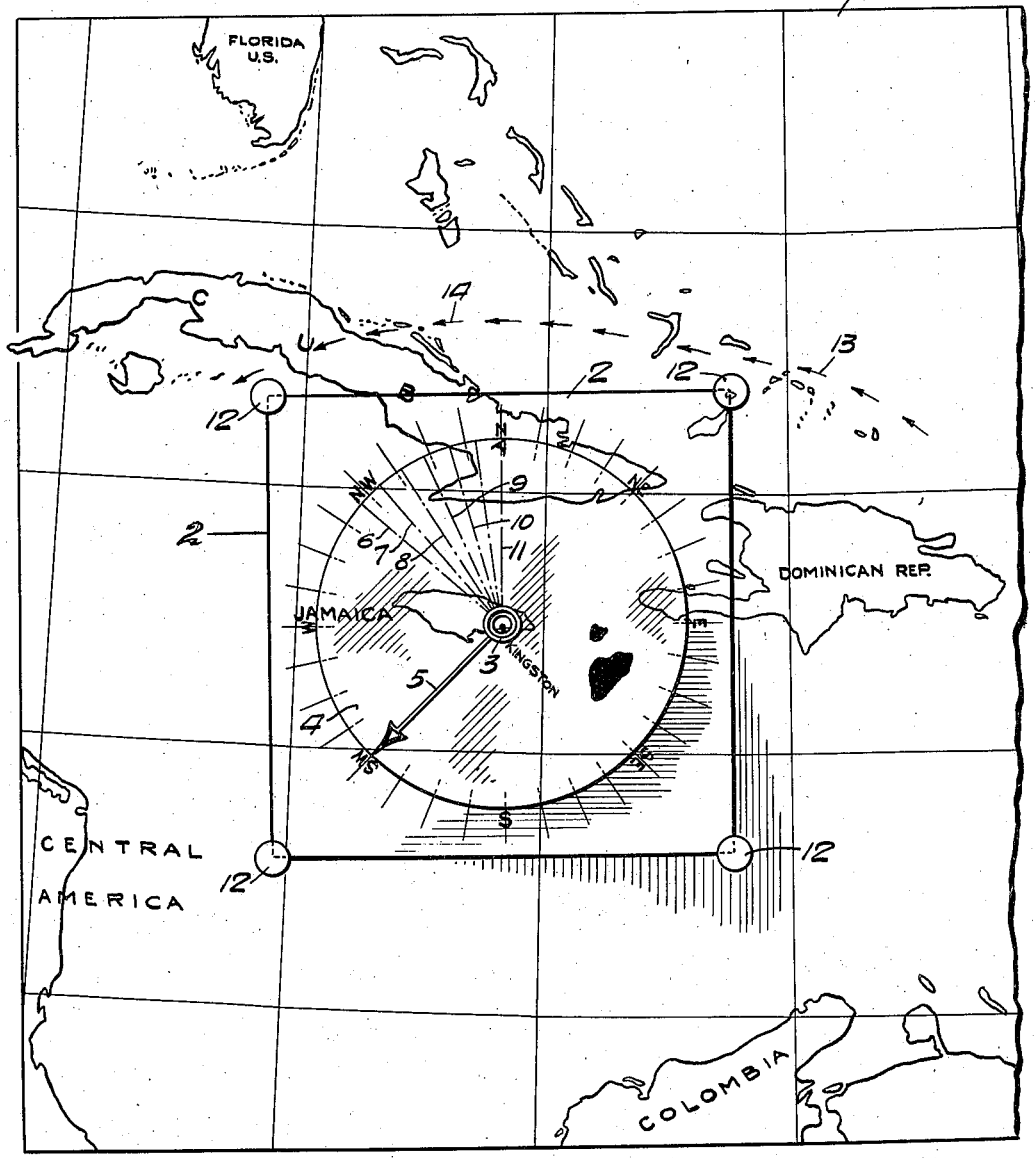

2,141,696

UNITED STATES PATENT OFFICE 2,141,696

STORM CENTER LOCATOR

Brent Trevelyan Rodd and George Element Judd, Fort Myers, Fla.

Application July 8, 1936, Serial No. 89,678

5 Claims. (Cl. 33—1)

The invention relates to a species of meteorological instrument and has for its general object the provision of a novel device or instrument by means of which land observers living in sections or localities subject to hurricanes may, without elaborate apparatus, training or knowledge, ascertain with a reasonable degree of accuracy the location of a storm center.

It is well known that the United States Weather Bureau issues weather reports at certain predetermined hours and that from such reports the probable course of a storm can be plotted on an appropriate map. It is also obvious that the direction of the wind can always be found and that in most cases a barometric reading at any given time can be obtained. It is a purpose of the present invention to utilize this data by the employment of the special instrument or device constituting the subject-matter of the invention so that untrained persons in coastal belts subject to hurricanes can obtain fairly definite information as to the location of the center of an approaching storm and thereby probably be relieved of considerable unnecessary fear and worry which results from the fact that accurate information always grows increasingly uncertain with the approach of a storm center, the use of the device being, however, not limited to land observers as it may be of considerable advantage even to mariners although seafaring folk, at least on ships or at certain stations, are better equipped, that is to say, provided with more accurate instruments by means of which the desired information may be obtained.

A more specific object of the invention is to provide a very simple instrument or device which may be fastened down upon an appropriate map or chart at a given observation point and adjusted in accordance with wind directions and barometric readings to obtain the desired location of the storm center, the device being, moreover, extremely inexpensive to make and consequently a material contribution to the art.

To the attainment of the foregoing and other objects and advantages, the invention preferably consists in the construction and arrangement of parts and co-relation of indicia to be hereinafter more fully described and claimed and illustrated in the accompanying drawings in which:

Figure 1 is a fragmentary view showing a map of the West Indies and adjacent land with the device constituting the invention superposed thereon and in proper relation thereto to determine the location of a storm center, Figure 2 is a plan view of the device or indicator alone or removed from the map or chart, Figure 3 is a side elevation of the device, Figure 4 is a detail cross section taken on the line 4—4 of Figure 3.

Referring more particularly to the drawings, the numeral 1 designates a portion of a map or chart of the West Indies, etc., the more prominent islands of which are indicated by suitable legends, and it will also be seen that portions of Florida, Central America and South America are indicated. Numerals for these are unnecessary as the legends speak for themselves. The device itself is shown as comprising a preferably rectangular base 2 which is desirably made of Celluloid or some equivalent transparent material and upon which is rotatably mounted in secured relation thereto, for instance by an eyelet 3 in its center, a circular disk 4 likewise of transparent material. The base 2 is graduated along the periphery of the disk 4 to indicate the various points of the compass while the disk itself is inscribed with an arrow 5 and a plurality of indicia lines 6, 7, 8, 9, 10 and 11, more or less if desired, indicating different barometric readings.

In order to illustrate the use and desirability of employment of the device it is probably preferable to give a concrete example. Therefore let it be assumed that an observer at Kingston, Jamaica, wishes to ascertain the approximate location of the center of a hurricane. Such being the case the observer takes the device and places it on a map, preferably of reasonably large scale, with the center of the eyelet disposed over the Kingston indication on the map in such position that the North reading on the device or base 2 will correspond with North on the map. The base 2 should then be anchored down, for example by means of thumb tacks 12 so that it will not accidentally shift its position, it of course being apparent that the map itself should be placed upon a board or other support capable of receiving and retaining the thumb tacks or other equivalent securing elements. It is desirable that an additional thumb tack be inserted through the eyelet at the point of observation to insure non-shifting of the device. The disk 4 is naturally free to turn upon the base 2.

The above preliminary steps having been attended to, when the storm area begins to reach the point of observation, which may require twenty-four hours or more depending upon its extent, the observer should rotate the disk 4 until the arrow 5 thereon points into the wind. In the present instance it is assumed that the wind is blowing from the Southwest. The next step is for the observer to plot the course of the storm center, as far as it is known, from data obtainable from the official reports of the United States Weather Bureau and to continue or prolong it in the path it may logically be expected to follow. This course is indicated by the line of arrows 13 in accordance with the Weather Bureau practice. Subsequently to this it is necessary to obtain a local barometer reading and to select whichever one of the lines 6, 7, 8, 9, 10 or 11 on the disk is the closest to this reading. Whichever is the correct line is then protracted to a point where it intersects the previously plotted course of the storm center, which course is indicated by the arrows 13. This point of intersection will be the location of the storm center at that time. In the present instance, assuming that the wind is blowing from the Southwest and that the barometer reading is 29.15 it will be seen that the approximate location of the storm center will be near the northern coast of Cuba, this point being indicated by the numeral 14.

In case a barometer reading is not available it is helpful to remember that the nearer the storm and the stronger the wind the smaller will be the angle between the appropriate barometer reading line, if a reading were available, and the wind direction indicating arrow 5, or in other words that the barometer would read 27.55 or less. As a general rule, it will be 90° or more, that is to say the barometer reading, if available, would be 27.95 or upwards, the imaginary angle becoming smaller as the storm center approaches. This data though only estimated and therefore not definite will enable the observer to make an approximate determination of the location of the storm center. If the wind direction remains the same and the velocity increases gradually, the hurricane is getting nearer, or if the angle between the wind direction and the protraction of the probable, if available, barometer reading intersecting the plotted storm path decreases and at the same time the wind velocity increases the storm center is approaching the observer. If this estimated angle between the wind direction and probable barometer reading decreases more or less rapidly, with the wind velocity fairly constant, the storm center is turning in a clockwise direction, whereas if the assumed or estimated angle increases, with the wind velocity fairly constant, the reverse is true, or, in other words, the storm center is traveling in a counter-clockwise direction, as indicated on the drawings.

From the foregoing description and a study of the drawings it will be apparent that we have thus provided an extremely simple device which may be used anywhere by a person untrained in meteorological observation but which will, nevertheless, give fairly accurate information which may be used as a guide for shipping or to indicate that preparation should be made in anticipation of a severe storm so that personal injury and property damage may possibly be avoided.

While we have shown and described the preferred form of the invention, it should be understood that the disclosure is merely an exemplification of the principles involved and that the right is reserved to make all such changes as will not depart from the salient features of the invention or the scope of the claims hereunto appended.

Having thus described our invention, what we claim is:

1. A meteorological instrument comprising a supporting member having points of the compass indications thereon and disposable upon a map in corresponding relation to the North direction on the map with its center at a given observation point, means rotatably mounted on said support for indicating the direction of the wind at a given time, and means rotatably mounted on said support for indicating graphically the proper barometric reading at said given time, said first and second named means constituting the first and second named legs or sides of an angle, said angle being fixed for any particular barometric reading, the projection or protraction of the second named side or leg of the angle intersecting a previously plotted line indicating the known and probable course of a storm so that the point of intersection of said protracted leg or side of the angle with said line will indicate the approximate location of the storm center at the said given time.

2. A storm center locator comprising a supporting member inscribed with points of the compass and disposable upon a map in corresponding relation to the North indicia on the map, a member pivotally mounted on said support having a line indicating wind direction, said pivoted member being movable to dispose said line in a direction facing into the wind, said pivoted member having a plurality of lines thereon indicating various barometric readings, said support being disposable upon a map with the center point of said pivoted member at a given observation point so that a protraction of the proper one of the barometer reading indicating lines will intersect a previously plotted line indicating the known and subsequently probable course of a storm, said point of intersection designating the approximate point of location of the storm center at a given time.

3. A storm center locator comprising a supporting member having indicia thereon as to the points of the compass and disposable upon a flat Mercator's map with its center at a given observation point and with its North indication corresponding to North on the map, a disk rotatably mounted at the center of said supporting member inscribed with a line adapted to be moved into a direction from which the wind is blowing, said disk being further inscribed with a series of radial lines adjacent which are various barometric readings, said map having plotted thereon the known and probable course of a storm as determined from government reports whereby upon movement of the disk into a position with the wind direction line facing into the wind and the obtaining of a barometric reading at a given time the projection or protraction of the line corresponding to said barometric reading at said given time will intersect the probable course of the storm, the point of intersection indicating the approximate location of the storm center at said given time.

4. A device of the character described comprising a supporting member and a disk pivoted thereon, the supporting member being disposable upon a flat map of the Mercator projection type with the pivot point of the disk at a given observation point, the supporting member being inscribed adjacent the periphery of the disk with indicia corresponding to points of the compass and the supporting member being intended to be disposed upon the map with its North indicia corresponding to the North indication on the map, said disk carrying a pointer and a plurality of lines in fixed angular relation to the pointer and adjacent which are successive various barometric readings whereby when the disk is rotated to bring the pointer into the direction of the wind the protraction of the proper line corresponding to the barometric reading at a given time will result in intersection with the plotted known and assumed probable course of the storm so that the point of intersection will indicate the approximate location of the storm center.

5. A device of the character described comprising a supporting member and a disk pivoted thereon, the supporting member being disposable upon a flat map of the Mercator projection type with the pivot point of the disk at a given observation point, the supporting member being inscribed adjacent the periphery of the disk with indicia corresponding to points of the compass and the supporting member being intended to be disposed upon the map with its North indicia corresponding to the North indication on the map, said disk carrying a pointer and a plurality of lines in angular relation to the pointer and adjacent which are successive various barometric readings whereby when the disk is rotated to bring the pointer into the direction of the wind the protraction of the proper line corresponding to the barometric reading at a given time will result in intersection with the plotted known and probable course of the storm so that the point of intersection will indicate the approximate location of the storm center, said supporting member and said disk being of transparent material.

BRENT TREVELYAN RODD.
GEORGE ELEMENT JUDD.